(12) United States Patent
Quentin (10) Patent No.: US 11,025,973 B2
(45) Date of Patent: Jun. 1, 2021

(54) METHOD FOR THE EXECUTION AND PROCESSING OF DATA, CORRESPONDING DEVICE AND COMPUTER PROGRAM

(71) Applicant: INGENICO GROUP, Paris (FR)

(72) Inventor: Pierre Quentin, Enghien-les-Bains (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 15/437,702

(22) Filed: Feb. 21, 2017

(65) Prior Publication Data

US 2017/0257655 A1 Sep. 7, 2017

(30) Foreign Application Priority Data

Mar. 3, 2016 (FR) ...................................... 1651814

(51) Int. Cl.
| | |
|---|---|
| *H04N 21/254* | (2011.01) |
| *G06F 9/451* | (2018.01) |
| *G06F 16/903* | (2019.01) |
| *G06F 21/53* | (2013.01) |
| *G06F 9/445* | (2018.01) |

(Continued)

(52) U.S. Cl.
CPC ......... *H04N 21/2541* (2013.01); *G06F 9/445* (2013.01); *G06F 9/452* (2018.02); *G06F 16/90335* (2019.01); *G06F 21/53* (2013.01); *G06Q 20/102* (2013.01); *H04L 63/08* (2013.01); *H04L 63/10* (2013.01); *H04N 21/2543* (2013.01); *H04N 21/4437* (2013.01);

(Continued)

(58) Field of Classification Search
None
See application file for complete search history.

(56) References Cited

U.S. PATENT DOCUMENTS

2003/0235303 A1* 12/2003 Evans ..................... G06F 21/84
380/216
2012/0284513 A1 11/2012 Yerli
(Continued)

FOREIGN PATENT DOCUMENTS

EP 2953047 A1 12/2015

OTHER PUBLICATIONS

Preliminary Search Report with regard to FR 1651814 dated Oct. 25, 2016.
(Continued)

*Primary Examiner* — Justin E Shepard
(74) *Attorney, Agent, or Firm* — David D. Brush; Westman, Champlin & Koehler, P.A.

(57) ABSTRACT

A method for executing a user application is disclosed. The method is implemented within a communications terminal of the type having a trusted environment. The trusted environment has a secured storage space and a secured applications execution module. The method has: a step of reception, within the trusted environment, of an instruction for launching a user application; a step of transmission, to a server, of a request for executing said user application; a step of reception, from the server, by a video-rendering application that is executed within the trusted environment, of a video stream resulting from the execution, on the server, of said user application; and a step for displaying said video stream on a screen of said communications terminal accessible from said trusted environment.

9 Claims, 3 Drawing Sheets

(51) Int. Cl.
*G06Q 20/10* (2012.01)
*H04L 29/06* (2006.01)
*H04N 21/2543* (2011.01)
*H04N 21/443* (2011.01)
*H04N 21/4627* (2011.01)
*H04N 21/81* (2011.01)
*H04N 21/426* (2011.01)

(52) U.S. Cl.
CPC ..... *H04N 21/4627* (2013.01); *H04N 21/8166* (2013.01); *H04N 21/42623* (2013.01)

(56) References Cited

U.S. PATENT DOCUMENTS

| | | | | |
|---|---|---|---|---|
| 2015/0082239 | A1* | 3/2015 | Zhao | H04L 67/2823 715/788 |
| 2015/0161384 | A1* | 6/2015 | Gu | G06F 21/54 726/22 |
| 2016/0267462 | A1* | 9/2016 | Batlle | G06Q 20/3255 |
| 2016/0364551 | A1* | 12/2016 | Bouazizi | H04N 21/25816 |

OTHER PUBLICATIONS

Garrels, "Introduction to Linux. A Hands on Guide", Extract from Internet: http://www.tldp.org/LDP/intro-linux/intro-linux.pdf, 2008, pp. 176-182.

English Abstract of EP2953047 retrieved on Espacenet on Feb. 20, 2017.

English translation of the Written Opinion dated Oct. 25, 2016, for corresponding French Application No. 1651814.

\* cited by examiner

METHOD FOR THE EXECUTION AND PROCESSING OF DATA, CORRESPONDING DEVICE AND COMPUTER PROGRAM

1. CROSS-REFERENCE

The present application claims priority to French Patent Application No. 1651814, filed on Mar. 3, 2016, the entirety of which is incorporated herein by reference.

2. FIELD OF THE INVENTION

The invention relates to the field of the security of the transmission, reception and processing of sensitive data by a user's communications terminal. The proposed technique can be applied naturally in payment operations carried out between a communications terminal and a server. The proposed technique also naturally finds application in any processing of sensitive data related to the integrity, personality or identity of a user of a communications terminal.

3. PRIOR ART

Communications terminals, and more generally users' communications terminals such as Smartphones, tablets, connected watches, portable computers etc., are omnipresent in daily life amongst a growing proportion of the population. These communications terminals are being used for a growing number of tasks ranging from the trivial (such as the task of counting the number of steps made in a day) to the most sensitive (such as the monitoring of a parameter vital for health, surveillance of a dwelling, managing a bank account, making payment etc.). Manufacturers, aware of these uses of their terminals, have been proposing technical securing solutions for many years now. Such technical solutions for securing ensure a certain confidentiality of data processed and/or exchanged between communications terminals. These technical securing solutions predominantly require the implementing of a secured execution environment and/or a trusted component (also called a secure element). A trusted component or secure element is a specific electronic component present in the printed circuit board of the communications terminal. It comprises at least a secured storage space that enables the recording of encryption keys, identifiers (for example, payment identifiers, bank identifiers, social security identifiers insurance identifiers etc.). It is clear that this information is highly sensitive in nature and must be protected against attempts at fraud or identity theft.

At the outset, the trusted component offered few functions, apart from storage of sensitive data. Over time, it became apparent that there were more complex operations that needed to be performed in total security by the communications terminal. This is why the trusted component or secure element has been coupled with (or replaced by) a secured execution environment. Thus, depending on the securing techniques used, it can happen that the trusted component is eliminated and that the secured execution environment acts both as a trusted component and as a secured environment. It is for this purpose that a standard defining the characteristics of a secured execution environment has been defined and is beginning to be adopted by the industry.

The secured execution environment is an isolated environment that works in parallel with the operating system of the communications terminal providing execution security relative to a "rich" unsecured environment. It offers a level of security sufficient for most applications. The trusted applications being executed in a secured execution environment have access to all the power of the processor and the main memory of the communications terminal while the isolation of the equipment theoretically protects the processor and the main memory by means of the user-installed application being executed in the main operating system.

For the requirements of the present invention, it is assumed that the communications terminal embeds a mechanism that has both secured storage space and a secured execution environment which especially handles the data of the secured storage space. For the requirements of the present invention, this mechanism is called a trusted environment.

One of the problems encountered by trusted environments lies in the programming interface (the API) made available to the rich environment which, under certain conditions, can be hacked and enables direct access to all or part of a random-access memory zone used by the trusted environment. Various types of attack can be considered. Another problem posed by the trusted environment is that it does not allow the execution of all the applications. Indeed, although the trusted environment can theoretically execute any type of application, first of all the applications must be certified. This for the time being is a solution that is little used: the characteristics of the trusted environment are going through phases of standardization but the different implementations of these environments are relatively heterogeneous and do not necessarily ensure compatibility of certification. Finally, recent applications, because of the multiple functions that they propose, have a great tendency to become bulky: the quantity of random-access memory used by these applications is fairly large and requires that the trusted environment should be capable of efficiently managing both the memory volume needed to execute the application and the speed and the fluidity of this application.

It is therefore necessary to propose a reliable and low-cost solution providing security given by a trusted environment while limiting the cost of certifying the application.

4. SUMMARY

The proposed technique at least partly resolves the problems raised by prior art techniques. Indeed, rather than implementing a confidential data-processing application within the trusted component, the present technique implements only a video decoding application.

This technique has the advantage of not inducing any vulnerability in the communications terminal. Indeed, it is not possible to benefit from the relative open nature of the operating system of the communications terminal to try and compromise the data entered or received by the communications terminal.

More particularly, the invention discloses a method for executing a user application, the method being implemented within a communications terminal of the type comprising a trusted environment, said trusted environment comprising a secured storage space and a secured applications execution module. Such a method comprises:

- a step of reception, within the trusted environment, of an instruction for launching a user application;
- a step of transmission, to a server, of a request for executing said user application;
- a step of reception, from the server, by a video-rendering application that is executed within the trusted environment, of a video stream resulting from the execution, on the server, of the user application;

a step for displaying said video stream on a screen of said communications terminal accessible from said trusted environment.

Thus a fraudulent or malicious application being executed on the communications terminal cannot intercept the data exchanged with the user application. Indeed, since this application is not executed by the terminal, the malicious application cannot act in or spy on the operation of the user's application. At best, in the event of concealed-channel attacks, the malicious application could obtain information on the load of a processor: the malicious application however would not be able to draw any conclusion from this information since the load would represent the execution of the video-rendering application and not the execution of the user application.

According to one particular characteristic, prior to said step for transmitting said execution request, there is a step for setting up, by said trusted environment, with said server, a secured transmission channel.

Thus, the exchanges made between the trusted environment of the terminal and the server are protected by this secured communications channel.

According to one particular characteristic, prior to the step for displaying the video stream, there is a step for decrypting said video stream.

Thus, even if the video stream is intercepted by a fraudulent device or method, the video stream cannot be displayed before it has been decrypted by the trusted environment.

According to one particular characteristic, said user application is a payment application.

According to one particular characteristic, said request for executing said user application comprises at least one piece of data for identifying the user and at least one piece of data for identifying said user application.

According to another aspect, a method is also disclosed for executing a user application within a server. Such a method comprises:
- a step of reception, from a trusted environment of a communications terminal, of a request for executing said user application;
- a step for obtaining at least one piece of data needed for executing said user application as a function of at least one piece of data of the request and a source of complementary data;
- a step of instantiation of said user application, activating the execution of said user application;
- a step for obtaining a video stream coming from the execution of said user application;
- a step of transmission, to said trusted environment of said communications terminal, of said video stream.

According to one particular characteristic, said step for instantiating said user application comprises:
- a step of searching, within an application storage data structure, for said user application, said search being based on at least one piece of data of said request for execution of service;
- a step of loading, within a memory of said server, a virtual machine and a step for launching said user application within said virtual machine.

Thus, the execution of the user application is isolated from the server itself. Any dysfunction of the user application therefore cannot disturb the execution of the server which remains independent of the user application.

According to another aspect, there is also described a communications terminal of the type comprising a trusted environment, said trusted environment comprising a secured storage space and a secured applications executing module, the terminal being capable of executing at least one application within said trusted environment.

Such a terminal comprises:
- means for receiving, within the trusted environment, an instruction for launching a user application;
- means for transmitting a request for executing said user application to a server;
- means for receiving, from the server, by a video-rendering application executed within the trusted environment, a video stream resulting from the execution, on the server, of said user application;
- means for displaying said video stream on a screen of said communications terminal, accessible from said trusted environment.

According to another aspect, a server is also described for the execution of a user application. Such a server comprises:
- means for receiving, from a trusted environment of a communications terminal, a request for executing said user application;
- means for obtaining at least one piece of data needed for the execution of said user application as a function of at least one piece of data of the request and a source of complementary data;
- means for instantiating of said user application, activating the execution of said user application;
- means for obtaining a video stream coming from the execution of said user application;
- means for transmitting, to said trusted environment of said communications terminal, said video stream.

According to a preferred implementation, the different steps of the methods according to the proposed technique are implemented by one or more software programs or computer programs comprising software instructions to be executed by a data processor of a relay module according to the invention and being designed to command the execution of the different steps of the methods.

The proposed technique is therefore also aimed at providing a program liable to be executed by a computer or by a data processor, this program comprising instructions to command the execution of the steps of a method as mentioned here above.

This program can use any programming language whatsoever and can be in the form of source code, object code or a code that is intermediate between source code and object code, such as in a partially compiled form or in any other desirable form.

The proposed technique is also aimed at providing an information carrier readable by a data processor and comprising instructions of a program as mentioned here above.

The information carrier can be any entity or device whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal that can be conveyed via an electrical or optical cable, by radio or by other means. The program according to the technique can especially be uploaded to an Internet type network.

As an alternative, the information carrier can be an integrated circuit into which the program is incorporated, the circuit being adapted to executing or to being used in the execution of the method in question.

According to one embodiment, the invention is implemented by means of software and/or hardware components. In this respect, the term "module" can correspond in this document equally well to a software component and a hardware component as to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router, etc) and is capable of accessing hardware resources of this physical entity (memories, recording carriers, communications buses, input/output electronic boards, user interfaces, etc).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smart card, a memory card, an electronic board for the execution of firmware, etc.

Each component of the system described here above naturally implements its own software modules.

The different embodiments described here above can be combined with each other to implement the proposed technique.

5. FIGURES

Other features and advantages of the proposed technique shall appear more clearly from the following description of a preferred embodiment, given by way of a simple illustratory and non-exhaustive example and from the appended drawings, of which.

6. DETAILED DESCRIPTION 6.1. General Principle

As explained here above, the proposed technique relates to a method for transmitting data to be displayed, the method being implemented between a user communications terminal (of the smartphone, tablet, connected watch type) and a server, the server being connected to the user communications terminal by means of a communications network. To implement the present technique, the communications terminal has an environment known as a trusted environment. This is for example a secured component, the function of which is to host firstly data, the confidentiality and integrity of which has to be ensured and secondly at least one application.

It has been pointed out that such a trusted environment is commonly used to carry out a number of securing processing operations or even to execute a complete application, for example, to generate encryption keys from mother keys or again to encrypt data before it is transmitted to third-party devices or applications.

On the contrary, the present technique makes an entirely novel use of such a trusted environment, making it possible to remove any doubt concerning the information received or transmitted within the communications terminal. The technique is more particularly suited to a simplified implementation of a display of information received from the server with which the communications terminal is connected. Thus, the general principle of the present invention consists in carrying out a video decoding of the data received by using the trusted environment at least partially. Thus, unlike in the prior art, the trusted environment is used not as a transactional device but as a video decoder. The use made of the trusted environment is different since rather than receiving text type data (such as for example data representing passwords, codes etc), the trusted environment receives video type data according to an adapted video encoding. The pieces of video data received are at least partially decoded by the trusted environment and written to the video memory (when it exists) of the communications terminal in order to be directly displayed.

Figure 1:
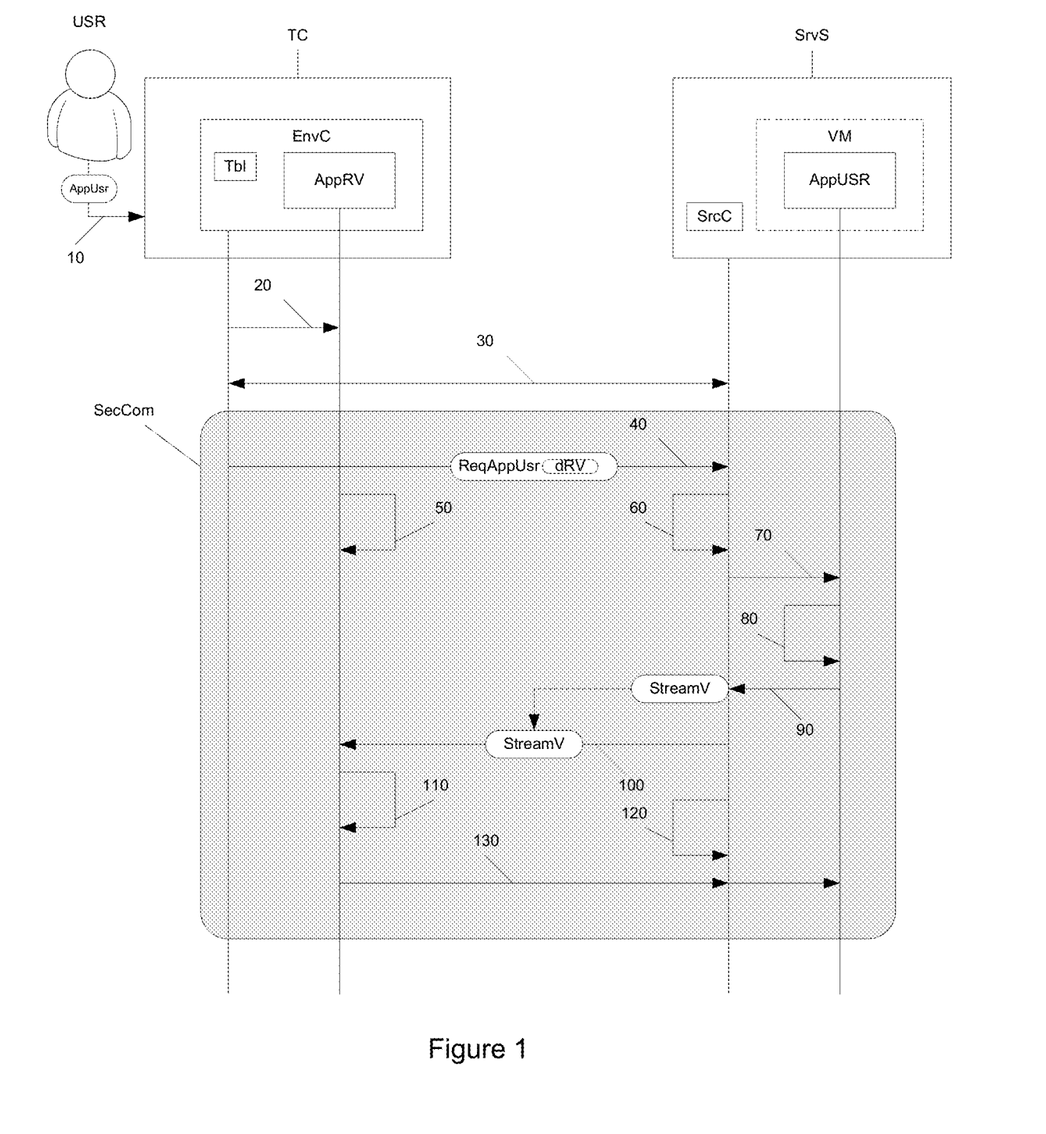
FIG. 1 illustrates the general principle of securing according to the present technique.

Thus, the data no longer travels in transit (or at least does not travel totally in transit) through the non-secured environment of the communications terminal. This means that, with the solution of the present technique, a fraudulent application which attempts, as it would do in the prior art, to access or modify the data received or transmitted to the trusted environment cannot do this easily (and as a rule cannot do it at all). More specifically, we describe the means and steps implemented in the context of the present invention with reference to FIGS. 1, 2 and 3 which have common reference numbers and designations for the elements illustrated. The general principle of operation described with reference to FIG. 1 is as follows:

the user of the communications terminal (TC) wishes to access a service managed by the server (SrvS);

the user (or another application) launches (10), on his communications terminal, the video-rendering application (AppRV) which enables access to the server; this video-rendering application (AppRV) is loaded into the trusted environment (EnvC); it comprises especially two modules: an entry module (modS) and a video-rendering module (modRV);

the application (AppRV) sets up a secured communications channel with the server and transmits a request for access to this server;

concomitantly, the video-rendering application (AppRV) displays a waiting interface or interface on hold (WScr) on the screen of the communications terminal; this interface on hold can include a logo, for example, an applications logo, making it possible to identify the service (the application) that has started; this makes it possible not to have a effect that is deceptive to the user; the logo is obtained by the video-rendering application, for example, from the secured storage space;

at reception of the request for access to the service, the server (SrvS):

obtains (60) data representing the service to be implemented;

instantiates the application AppUsr (70) (i.e. it loads, into its memory, one or more programs that implement the application AppUsr on behalf of the terminal) as a function of the previously obtained representative data;

the server extracts the video stream (90) coming from the execution of the service and transmits the stream (100) to the communications terminal by means of the previously established secured channel;

the application (AppRV) receives (100) the video stream coming from the server through the secured transmission channel and displays (110) it.

Thus, the implementing of this technique substantially limits the risks of theft or identity fraud. Indeed, the trusted environment, in the present invention, limits itself to implementing a video decoding application, an application that communicates with the server in two different ways: through the request for access to the service (transmitted when the application is started) and through an entry interface. The request for access to the service makes it possible to communicate the necessary data to the server. This can, for example, be configuration data proper to the communications terminal and/or to the user and pre-recorded in the trusted environment. The entry interface enables interaction with the application executed on the server as a function of the video transmitted by the server.

It is essential to understand that the server acts in place of the terminal. This means that the server executes an application which, with the prior art techniques, would have been executed on the terminal. For example, we assume that the user wishes to execute an application AppUsr (for example an application for consulting medical files). With the prior art techniques, the application AppUsr is executed directly by the communications terminal, and, when this is possible, at least partly in using the trusted environment. With the present technique, the application AppUsr is executed, for example, in a virtual machine (VM) on the server. The server is alone in charge of executing the application AppUsr. For its part, the terminal executes a video-rendering application (AppRV) in the trusted environment in order to guarantee the validity of the displayed video. The application AppRV as such is inoffensive; it does not handle any secret data, it does not carry out any sensitive processing. The video-rendering application AppRV limits itself to receiving a video stream from the server and transmitting data representing keys of the keypad entered by the user. This means that it is very complicated for a hacker to try and obtain confidential or secret data from such an application AppRV since it does not contain any such data and does not manage any such data.

Figure 2:
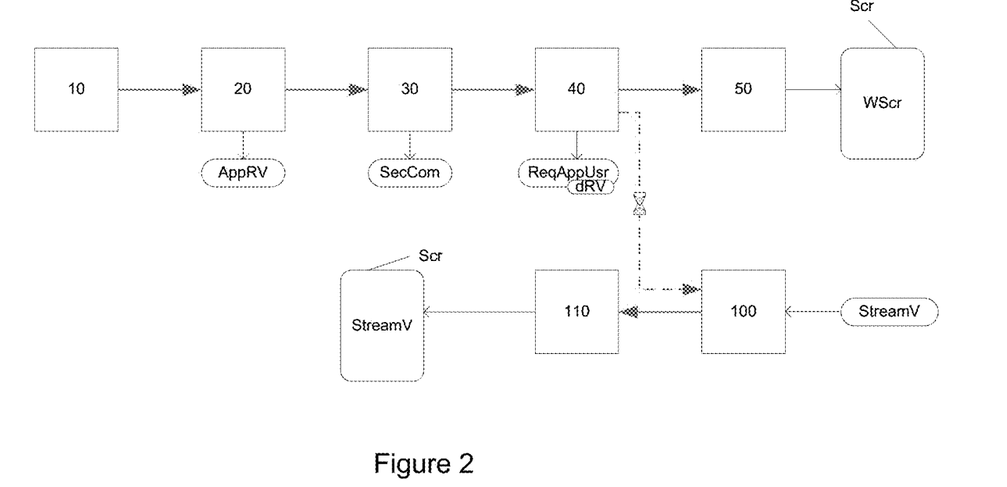
FIG. 2 provides a detailed description of the steps implemented in the trusted environment.

Referring to FIG. 2, we describe steps implemented through the communications terminal:

the video-rendering application AppRV is launched (20) within the trusted environment (EnvC) of the communications terminal (TC); this launch follows the reception (10) by the communications terminal of an instruction for launching the application AppUsr;

the launch instruction comes either from the user (Usr) or from a third-party service (not shown) which has requested the launching of the application;

a major characteristic is that both the user and the third-party service have actually expressed a wish to launch the application AppUsr and not the application AppRV; the fact that the application AppRV is launched instead of the application AppUsr results from parameters recorded within the trusted environment (EnvC) and not a will or explicit knowledge on the part of the user or of the third-party;

thus, the launch instruction is an instruction for launching the AppUsr application;

the trusted environment (EnvC) intercepts (21) the launch instruction of the application AppUsr and makes a search (22) within a correspondence table (Tbl), for a correspondence between an application AppUsr and a possible remote execution;

when such a correspondence is identified (for example by obtaining a corresponding registration in the table), the trusted environment (EnvC) launches (23) the application AppRV with the associated parameters in the correspondence table (Tbl);

the trusted environment (EnvC) sets up (30) a secured communications channel (SecCom) with the server: this if necessary is done through a negotiation of a session key (from a pair of public/private keys for the server and a pair for the trusted environment) used to encrypt the exchanges between the server and the trusted environment (EnvC);

the trusted environment (EnvC) transmits (40) a service execution request (ReqAppUsr) on this secured communications channel: this service execution request (ReqAppUsr) comprises at least one piece of data called video-rendering data (dRV): this piece of data enables the server which receives it to know the interface towards which it must transmit the video stream resulting from the execution of the application AppUsr.

among the pieces of video-rendering data there are especially one or more addresses (IP addresses, connection data, MAC address);

it is also possible to find therein a screen resolution value informing the AppUsr application about the range of resolution that it must display;

the application AppRV goes into hold state (50) pending reception of a video stream coming from the server: in this state it can display a logo related to the application AppUsr.

One immediate advantage of this technique is that it enables the association of several sensitive applications with one and the same application on the user terminal. Indeed, several user applications can use this principle. A second advantage lies in the low maintenance required: rather than adapting several applications to disparate trusted environments, it is enough to adapt only one application, namely the video-rendering application. This leads to two other advantages: firstly, an economic advantage because the application maintenance costs are reduced; and an advantage in terms of security because it is not necessary to carry out numerous security audits in the user applications. Besides, this technique is also suited to ageing terminals or to low-capacity terminals that remain capable of executing applications.

Figure 3:
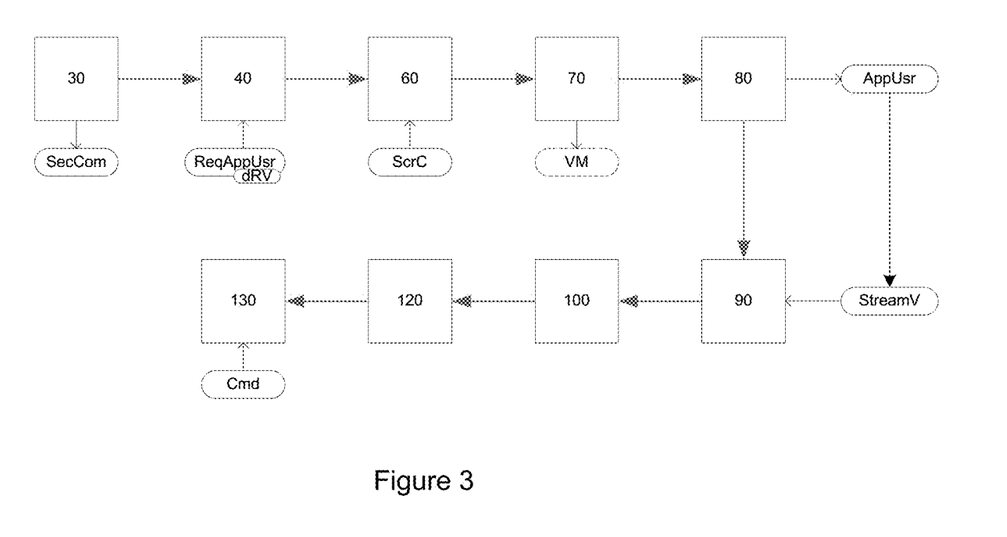
FIG. 3 explains the steps implemented within the server.

Referring now to FIG. 3, we present the steps implemented by the server:

the server receives (40) a service execution request (ReqAppUs) from the trusted environment (EnvC) of the communications terminal; this request can advantageously be preceded by a setting up (30) of a secured communications channel (SecCom) between the communications terminal and the server;

from this request, the server obtains (60) the data needed for executing the service; this data comes firstly from the request (ReqAppUsr) received from the trusted environment (EnvC) and sources of complementary data (SrcC) (databases or other servers having related data for implementing the service); this aspect is described in detail here below;

the server loads (70) the application AppUsr into memory either directly or by means of a virtual machine (VM) using previously obtained data;

the application AppUsr is executed (80);

the server captures (90) the video output of the application AppUsr and obtains a video stream (StreamV);

the server transmits (100) the video stream to the application AppRV by means of the secured channel (SecCom);

the server goes into a hold state (120) of waiting for commands received in the form of messages from the application AppRV, and retransmits these commands to the application AppUsr;

at reception (130) of a command (Cmd), the application AppUsr modifies its behavior to respond to the user's request, thus simulating the execution of the application AppUsr on the communications terminal.

Thus, the server acts in a way as a "proxy" between the communications terminal on which the video-rendering application AppRV is executed in the trusted environment and the AppUsr application itself executed on the server, therefore sheltered from hacking attempts or intrusion carried out on the communications terminal.

As indicated, it is necessary to have available data for the execution of the service; this data is of several types.

On the one hand, it is necessary to have available the user's application which must be executed. It is difficult to envisage a case where this application is transmitted by the user's communications terminal; this application is therefore accessible to the server in the source of complementary data (SrcC). More particularly, the source of complementary data comprises a depository of applications. This depository is managed directly from the server. In other words, the server is in charge of managing and updating the applications. To this end, the server gets connected for example, regularly to the applications stores (for example of the Google Play™ type, Apple Store™ or WindowsStore™) and obtains the applications that it is supposed to manage. In another alternative, the operation of these applications is emulated (in order to give the illusion that these are native applications): the applications in question are then proprietary applications, specifically developed for the server and not needing to be updated. Besides, these two approaches can be combined.

Furthermore, it is necessary to have data related to the user himself. These pieces of data are transmitted by the request (ReqAppUsr). These are especially data that relate to: the user (name, forename, identifiers). These data are related to the service rendered by the user application. For example, a medical type application could necessitate an additional identifier. This is also the case for a payment application. Other pieces of data are also transmitted: these are data on the user terminal: identifier of the terminal, screen resolution etc. Finally, pieces of data are specifically related to the user/terminal coupling. These are data that so to speak make it possible to ensure that the user and the terminal are permitted to implement the service (i.e. execute the user application).

Using this data, the server is capable of instantiating the application AppUsr as if it were executed on the user terminal. It is thus possible to give the illusion that the application is executed on the user terminal when it is not.

To enhance the sense of local execution, as it should be perceived by the user, a technique is implemented for encoding the video stream adapted to this processing: the encoding used is an H264 encoding and more particularly when possible an SVC (scalable video coding) type of encoding. The advantage of the standard is that, in the present case, very few pieces of data are needed when nothing happens. This means that, if the application executed on the server displays a screen, the interface undergone little change, and then pieces of data of the resulting video stream data are limited because they are pieces of data coming from a difference between the interface at an instant t and at an instant t+1. When between t and t+1 the interface does not change (for example because the user application is carrying out a background task), very little data are transmitted. However, if between t and t+1 the interface changes significantly, the amount data to be transmitted would be greater.

6.2. Application to Payment Made from the User's Communication Terminal

In one specific embodiment, the proposed technique is implemented in order to carry out a secured payment by means of the communications terminal which communicates with a payment server of a financial establishment. Unlike in the prior art, according to the proposed technique, the feedback information from a payment request is transmitted by the payment server in the form of a video stream. Thus, it is difficult for malicious applications or viruses in the operating system to intercept information about the payment. We shall first of all describe the mobile terminal and the payment server and then provide a detailed description of a complete method for making a secured payment with the mobile terminal and the server according to one embodiment of the invention.

6.2.1. Communications Terminal

Figure 4:
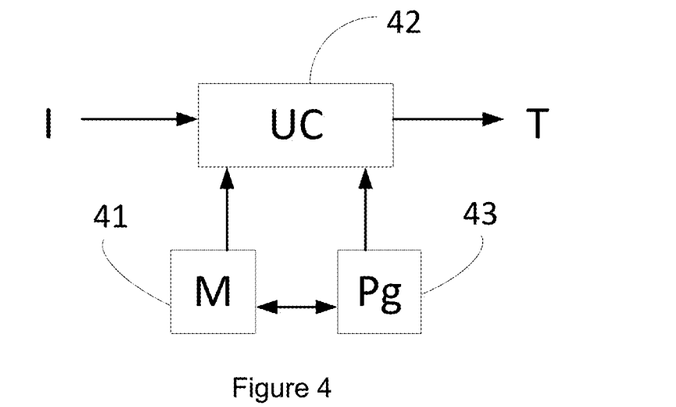
FIG. 4 provides a brief description of a communications terminal.

Referring to FIG. 4, we describe a data communications terminal comprising means for executing the method described here above. Such a terminal is described in the context of the implementation of a payment application but can of course be implemented also in the case of other applications.

For example, the communications terminal comprises a memory 41 constituted by a buffer memory, a processing unit 42 equipped for example with a microprocessor and driven by the computer program 43 implementing the steps needed to set up a secured communications channel with the server, during the reception of requests and the reception of video streams.

At initialization, the code instructions of the computer program 43 are for example loaded into a memory and then executed by the processor of the processing unit 42. The processing unit 42 inputs for example a command for executing user application. The microprocessor of the processing unit 42 implements the steps of the method according to the instructions of the computer program 43 to enable the establishment of a secured communications channel and the transmission of the execution request.

To this end, the processing device comprises, in addition to the buffer memory 41, a trusted environment comprising a secured storage memory and a secured execution module, means for obtaining encryption materials, encryption materials. These means can be driven by the processor of the programming unit 42 according to the computer program 43.

The communications terminal is also provided with a communications interface (Wi-Fi®, Bluetooth®, 3G, 4G, etc.).

The communications terminal is for example a smartphone comprising:

for example an NFC (Near Field Communication) module that is secured;

a secured keypad;

a secured; and a secured execution environment comprising:

a secured communications module that is capable of setting up a secured communications channel with a server (for example for payment);

a module for receiving data entered by the secured keypad and/or the secured NFC module (when this module exists);

a decoding application for decoding video streams connected and intended for the secured screen (i.e. to be sent to a secured video memory).

The secured NFC module makes it possible firstly to read the information of a payment card provided with the NFC function and secondly to communicate with the merchants' NFC terminals in order to exchange information on invoices to be paid for (especially their amount). The information on invoices to be settled can also be obtained (by using a Smartphone camera) in scanning 2D codes provided by the merchants. The secured keypad (whether virtual or physical) enables a user to enter for example an authentication code associated with his payment card. The information of a bank card or the information of a bank account can also be entered by the user via the secured keypad. According to one specific embodiment of the invention, the information of a bank card or a bank account can be preliminarily stored in a dedicated secured memory of the trusted environment.

The secured NFC module (when it exists) and the secured keypad are connected to a processing module of the trusted environment. Thus the information received by the secured NFC module and/or the secured keypad are not accessible to malicious application or viruses in the operating system.

The trusted environment (for example a TEE) comprises a secured zone of the processor of the terminal. It ensures the confidentiality and integrity of the codes (software modules) executed and data used within the environment. The secured communications module executed in the trusted environment is capable of setting up a secured communications channel with a payment server of a financial establishment. When the user decides to pay for a purchase made with a merchant and received by a reception module, a payment request is generated (in the trusted environment) according to the payment data (amount to be paid, merchant's account number, invoice identifier) and bank card data or data about the user's bank account. The payment request is transmitted to the payment server via the secured communications channel set up by the secured communications module.

In response to the request for payment, the payment server transmits a video stream through the secured communications channel. This video stream can be encrypted by the payment server. The decoder of the trusted environment decodes the video stream and displays it on the secured screen for the user. The contents of the video stream can be a confirmation of payment (debited amount and account, beneficiary etc), a rejection of payment (amount to be debited, payer's account, beneficiary's account, reasons for rejection), or a request for additional information (password, authentication code). The user can follow the instructions displayed on the secured screen (enter the password for example) in order to finalize the payment procedure. It must be noted that the video stream is decoded in the trusted environment and displayed directly on the secured stream. It is thus difficult for malicious applications or viruses in the "open" operating system to access the video stream. Besides, unlike with the text messages of the prior art, it is far more difficult to intercept (and interpret) the information in the video steam. Indeed, the analysis and extraction of information in a video stream requires processing operations that are costly and complicated in terms of time and hardware resources. The hardware sources of the communications terminals (more particularly Smartphones) are limited and are not sufficient to execute analysis applications of this type. In addition, malicious applications and viruses are often of small-sized in order to avoid being easily detected. It is difficult to include bulky video analysis libraries in the malicious applications and the viruses.

6.2.2. Payment Server

Figure 5:
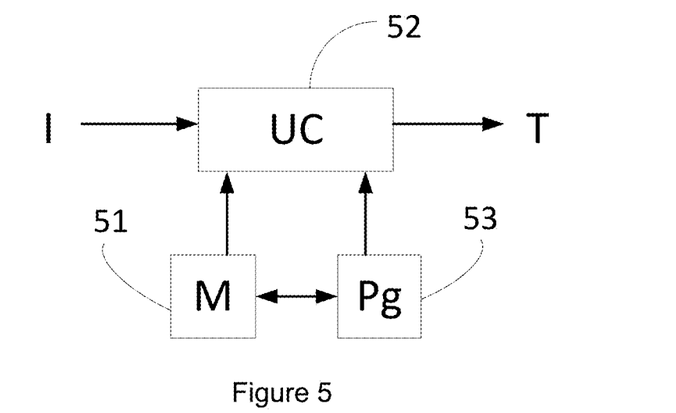
FIG. 5 is a brief description of an execution server.

Referring to FIG. 5, we describe a processing server, for example a payment server, comprising means for the execution of the method described here above.

For example, the processing server comprises a memory 51 constituted by a buffer memory, a processing unit 52 equipped for example with a microprocessor and driven by the computer program 53 implementing the steps needed to implement the functions of executing the user application and transmitting a video stream resulting from this execution.

At initialization, the code instructions of the computer program 53 are for example loaded into a memory and then executed by the processor of the processing unit 52. The processing unit 52 inputs for example a command for setting up a secured communications channel. The microprocessor or the processing unit 52 implements the steps of the processing method according to the instructions of the computer program 53 to set up a secured communications channel with the trusted environment of the communications terminal that has transmitted the request, and on the basis of this communications channel, it receives a request for executing a user application, executing this application in compliance with the data of the request and transmitting the video stream resulting from this execution to the trusted environment of the terminal.

To this end the device comprises, in addition to the buffer memory 51, encryption means, decryption means, means for obtaining applications execution data and means for processing a video stream; these means can advantageously take the form of a processor or a set of secured resources. The device also comprises cryptographic processing means; these processing means comprise for example a dedicated encryption processor.

These means can also be driven by the processor of the processing unit 52 as a function of the computer program 53.

In addition, the payment server of the proposed technique comprises a secured communications module, an execution module and a video stream obtaining module. The secured communications module is capable of setting up secured communications channels with the mobile terminals (for example a Smartphone) to make payments. The execution module enables a payment application according to the payment request transmitted by the mobile terminals and enables the sending of feedback information (possibly by means of a virtual machine). The generation module is capable of obtaining or picking up video streams according to the feedback information sent out by the execution module for the corresponding mobile terminals. According to one particular embodiment, the obtaining module retrieves a video stream dynamically according to the data sent out by the execution module and the additional data (for example password, authentication code) sent out after the transmission of the payment request by the communications terminal. The video stream can be encrypted and is transmitted in real time to the communications terminal throughout the payment procedure. The user thus has the illusion that the payments application is executed locally, on the communications terminal.

6.2.3. Method for Executing a Secured Payment

Figure 6:
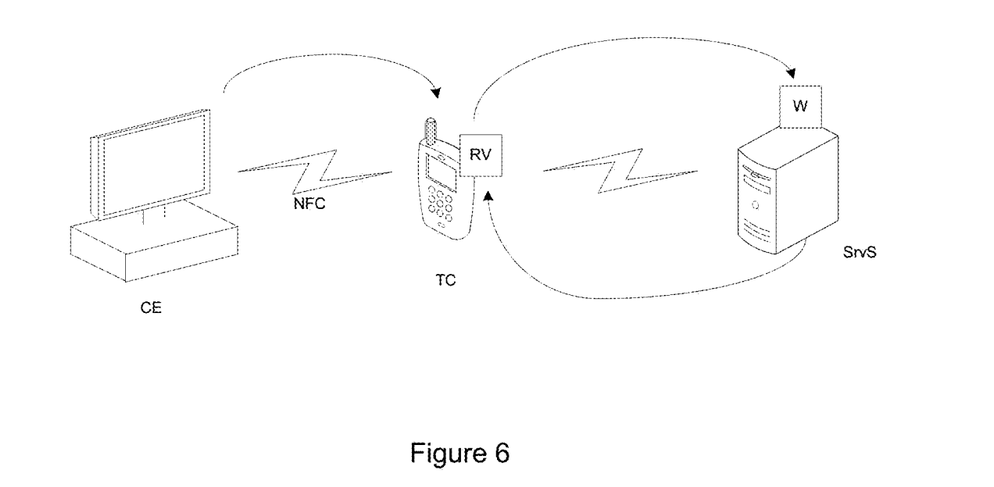
FIG. 6 describes the application of the method for transmitting data for payment made from the user's communications terminal.

According to FIG. 6, we describe a case of use of the technique previously described in order to carry out a payment.

When a user comes before a cash desk (CE) of a store to make a purchase, the merchant's cash desk generates an invoice comprising the merchant's name and bank account number, and the identifier and amount of the invoice. The user makes his Smartphone (TC), provided with an NFC module, pass over an NFC device connected to the merchant's cash desk in order to make payment (for example by using an electronic wallet or a Wallet—W type application). To make payment by using Wallet type application, the Smartphone (TC) transmits a payment request to a payment server of a financial establishment, via a secured communications channel set up by the secured communications module. The request can include information to identify the merchant and the purchase as well as information about a bank card or a bank account of the user. The information on the bank card and the information on the bank account can be entered through the NFC module or manually through the secured keypad of the Smartphone. It can also be preliminarily stored in a secured memory dedicated to the secured execution environment.

The Wallet (W) is implemented by the server (SrvS) itself and not by the smartphone. The payment server receives the payment request and carries out the payment by means of an execution module (for example a virtual machine) in launching the corresponding application (W). The execution application sends out feedback information and transmits it to the video stream obtaining module. The obtaining module picks up the video stream and transmits it to the user's Smartphone (TC) through the secured communications channel set up between the Smartphone and the payment server. A decoder (RV) in the secured execution environment of the Smartphone decodes the video stream and displays it on the secured screen. The return information transmitted by the execution module of the payment server can relate to several different types of information:
- a first type of information relates to a confirmation of successfully executed payment;
- a second type of information relates to a request for additional information (entry of identifier or authentication code for example);
- a third type of information relates to a rejection of payment.

The video stream that is obtained at output of the execution module of the server results directly from the execution of an instance of the application on the server. The video stream therefore depends on the additional data possibly entered by the user during the display of the video. Each time that the user enters a new character, the communications module of the Smartphone transmits the character entered by the payment server. Thus, for example, when the execution module receives a first character (an authentication code constituted by four characters), the application modifies its display and therefore the video stream transmitted to the Smartphone is modified. Thus, the video stream is interactive and enables the user to be informed of the progress of the execution of payment in real time.

Several other cases of use can be described, especially that of payment for a purchase from a shop online using a communications terminal. Such a purchase would also require implementing an application on the payment server. This application could be a Web browser, executed within the payment server.

The invention claimed is:

1. A method for executing a payment application, the method being implemented within a communications terminal, wherein the communication terminal comprises a trusted environment, said trusted environment comprising a secured storage space and a secured applications execution module implemented in a secured component, the method comprising:
   receiving a selection on the communications terminal, from a user of said communications terminal, the payment application to be executed;
   receiving, by the communications terminal, from the user of said communications terminal, connection data for said payment application, said connection data comprising at least one piece of data identifying said user of said communications terminal and at least one piece of data for identifying said payment application;
   receiving, by the communications terminal, within the trusted environment, an instruction for launching the payment application, from said user;
   transmitting, by the communications terminal, through a secured communications module of the trusted environment, to a server, a request for remotely executing said payment application, said request comprising said connection data and at least one piece of data identifying said communications terminal;
   receiving, by the communications terminal, from the server, by a video-rendering application executed within the trusted environment, a video stream resulting from remote execution, on the server, of said payment application, as a function of said connection data and said at least one piece of data identifying said communications terminal; and
   displaying said video stream on a screen of said communications terminal accessible from said trusted environment through a decoding application for decoding video streams, the decoding application being executed within the trusted environment.

2. The method for executing according to claim 1, further comprising, prior to said transmitting said execution request, setting up, by said trusted environment, with said server, a secured transmission channel.

3. The method for executing according to claim 1, further comprising, prior to the displaying the video stream, decrypting said video stream.

4. The method for executing according to claim 1, wherein said request for executing said payment application comprises at least one piece of data for identifying a user and at least one piece of data for identifying said payment application.

5. A method for executing a payment application within a server, the method comprising:
   selecting on a communications terminal, by a user of said communications terminal, the payment application to be executed;
   providing, by the user of said communications terminal, connection data for said payment application, said connection data comprising at least one piece of data identifying said user of said communications terminal and at least one piece of data for identifying said payment application;
   receiving, by the server, from a trusted environment of the communications terminal through a secured communications module of said trusted environment, a request for executing said payment application, said request comprising said connection data and at least one piece of data identifying said communications terminal;
   obtaining, by the server, at least one piece of data needed for executing said payment application as a function of said connection data, the at least one piece of data identifying said communications terminal and a source of complementary data;

instantiating, by the server, said payment application, activating the execution of said payment application;

obtaining, by the server, a video stream coming from execution of said payment application; and transmitting said video stream, by the server, to said trusted environment of said communications terminal through a secured channel managed by said trusted environment of said communications terminal, provoking displaying said video stream on a screen of said communications terminal accessible from said trusted environment through a decoding application for decoding video streams, the decoding application being executed within the trusted environment.

6. The method for executing according to claim 5, wherein instantiating said payment application comprises:

searching, within an application storage data structure, for said payment application, said search being based on at least one piece of data of said request for execution of service; and loading, within a memory of said server, a virtual machine and a step for launching said payment application within said virtual machine.

7. A communications terminal of the type comprising a trusted environment, said trusted environment comprising a secured storage space and a secured applications executing module, the terminal being capable of executing at least one application within said trusted environment implemented in a secured component, said terminal comprising:

means for allowing a user of said communications terminal, to select, on the communication terminal, the payment application to execute;

means for providing connection data for said payment application, said connection data comprising at least one piece of data identifying said user of said communications terminal and at least one piece of data for identifying said payment application;

means for receiving, within the trusted environment through a secured communications module, an instruction for launching a payment application;

means for transmitting, thru a secured communications module of the trusted environment, a request for remotely executing said payment application to a server, said request comprising said connection data and at least one piece of data identifying said communications terminal;

means for receiving, from the server, by a video-rendering application executed within the trusted environment, a video stream resulting from remote execution, on the server, of said payment application, as a function of said connection data and said at least one piece of data identifying said communications terminal; and means for displaying said video stream on a screen of said communications terminal, accessible from said trusted environment through a decoding application for decoding video streams, the decoding application being executed within the trusted environment.

8. A server for execution of a payment application comprising:

means for receiving, from a trusted environment of a communications terminal through a secured communications module of said trusted environment, a request for executing said payment application, said request comprising connection data and at least one piece of data identifying said communications terminal, said connection data comprising at least one piece of data identifying said user of said communications terminal and at least one piece of data for identifying said payment application;

means for obtaining at least one piece of data needed for executing said payment application as a function of said connection date, the at least one piece of data identifying said communications terminal and a source of complementary data;

means for instantiating said payment application, activating the execution of said payment application;

means for obtaining a video stream coming from execution of said payment application; and means for transmitting said video stream, through a secured channel managed by said trusted environment of said communications terminal, to said trusted environment of said communications terminal, of, provoking displaying said video stream on a screen of said communications terminal accessible from said trusted environment through a decoding application for decoding video streams, the decoding application being executed within the trusted environment.

9. A non-transitory computer-readable medium comprising a computer program product stored thereon comprising program code instructions for executing a method for executing a payment application when the program code instructions are executed on a processor of a processing entity, wherein the instructions configure the processing entity to perform acts comprising:

receiving a selection on the communications terminal, by a user of said communications terminal, the payment application to be executed;

receiving, by the communications terminal, from the user of said communications terminal, connection data for said payment application, said connection data comprising at least one piece of data identifying said user of said communications terminal and at least one piece of data for identifying said payment application;

receiving, by the communications terminal, within the trusted environment, an instruction for launching the payment application, from said user;

transmitting, by the communications terminal, through a secured communications module of the trusted environment, to a server, a request for remotely executing said payment application, said request comprising said connection data and at least one piece of data identifying said communications terminal;

receiving, by the communications terminal, from the server, by a video-rendering application executed within the trusted environment, a video stream resulting from remote execution, on the server, of said payment application, as a function of said connection data and said at least one piece of data identifying said communications terminal; and displaying said video stream on a screen of said communications terminal accessible from said trusted environment through a decoding application for decoding video streams, the decoding application being executed within the trusted environment.

* * * * *